(12) United States Patent
Sarin (10) Patent No.: US 11,935,043 B2
(45) Date of Patent: Mar. 19, 2024

(54) ROUTING MULTIPLE TOKENS IN A SINGLE NETWORK HOP

(71) Applicant: PAYPAL, INC., San Jose, CA (US)

(72) Inventor: Pankaj Sarin, Elkhorn, NE (US)

(73) Assignee: PAYPAL, INC., San Jose, CA (US)

( * ) Notice: Subject to any disclaimer, the term of this patent is extended or adjusted under 35 U.S.C. 154(b) by 503 days.

(21) Appl. No.: 16/228,459

(22) Filed: Dec. 20, 2018

(65) Prior Publication Data

US 2020/0202341 A1 Jun. 25, 2020

(51) Int. Cl.
  *G06Q 20/38* (2012.01)
  *G06Q 20/32* (2012.01)
  *G06Q 20/36* (2012.01)

(52) U.S. Cl.
  CPC ....... *G06Q 20/385* (2013.01); *G06Q 20/3224* (2013.01); *G06Q 20/3672* (2013.01)

(58) Field of Classification Search
  CPC ............................................... G06Q 20/30–39
  USPC ........................................................ 705/66
  See application file for complete search history.

(56) References Cited

U.S. PATENT DOCUMENTS

| | | | | |
|---|---|---|---|---|
| 2007/0288254 A1* | 12/2007 | Eisner | ............... | G06Q 10/0637 358/1.11 |
| 2008/0288608 A1* | 11/2008 | Johnson | .................. | G06F 9/466 709/213 |
| 2009/0265631 A1* | 10/2009 | Sigurbjornsson | ...... | G06Q 10/10 715/716 |
| 2012/0310838 A1* | 12/2012 | Harris | .................... | G06Q 20/12 705/65 |
| 2013/0124315 A1* | 5/2013 | Doughty | ............ | G06Q 30/0261 705/14.53 |
| 2014/0149293 A1* | 5/2014 | Laracey | ............... | G06Q 20/108 705/44 |
| 2015/0039279 A1* | 2/2015 | Volovoi | .................. | G06F 30/22 703/2 |
| 2015/0235327 A1* | 8/2015 | You | ........................ | G06F 16/283 705/30 |
| 2016/0232527 A1* | 8/2016 | Patterson | ............. | G06Q 20/405 |

(Continued)

OTHER PUBLICATIONS

PCT International Searching Authority—US, PCT Notification of Transmittal of the International Search Report and the Written Opinion of the International Searching Authority, or the Declaration, dated Mar. 16, 2020 for International Application No. PCT/US2019/068142, 11 pages, Alexandria, VA.

(Continued)

*Primary Examiner* — John W Hayes
*Assistant Examiner* — Cristina Owen Sherr
(74) *Attorney, Agent, or Firm* — HAYNES AND BOONE, LLP (57) ABSTRACT

The present disclosure is directed to consolidated token routing. First data corresponding to a request to conduct a first transaction is analyzed. A first token is generated for the first transaction. Second data corresponding to a request to conduct a second transaction is analyzed. A second token is generated for the second transaction. In response to determining that at least a first component of the first data corresponds to a first component of the second data, a routing of the first token and a routing of the second token are consolidated. The consolidation of the token routing includes transmitting the first token and the second token to one or more devices in a single transmission.

20 Claims, 5 Drawing Sheets

(56) References Cited

U.S. PATENT DOCUMENTS

| | | | | |
|---|---|---|---|---|
| 2018/0121895 A1* | 5/2018 | Mohrlock | ............ | G06Q 20/386 |
| 2019/0325424 A1* | 10/2019 | Yeddula | ............... | G06Q 20/401 |
| 2019/0340583 A1* | 11/2019 | Dubinsky | .............. | G06Q 20/40 |
| 2020/0059361 A1* | 2/2020 | Konda | .................. | H04L 9/3218 |

OTHER PUBLICATIONS

Boullier et al. "Trust architectures in payment systems: The great bifurcation." In: arXiv preprint. Jan. 2017 (Jan. 2017) Retrieved on Feb. 26, 2020 (Feb. 26, 2020) from https://arxfv.org/ftp/arxiv/papers/1708/1708.03864.pdf; 31 pages.

\* cited by examiner

ROUTING MULTIPLE TOKENS IN A SINGLE NETWORK HOP

BACKGROUND

Field of the Invention

The present invention generally relates to digital tokens and more particularly to optimizing the routing of such tokens generated for transactions conducting through computer networks.

Related Art

With the popularity of cross channel commerce (omnichannel), many payments are made across different channels (online, offline, mobile etc.). As the payment industry looks to a more secured method of transactions, tokenization has been implemented to protect end users' confidential financial information. However, the routing for tokens has not been optimized. Currently, multiple transactions conducted by a given user may require the generation separate tokens, and the tokens are then routed separately to complete the transactions. In other words, multiple transactions may lead to multiple network hops, where each token is routed via a different network hop. This may be a waste of network and computing resources. What is needed is an improved token routing scheme that better utilizes computer network resources than conventional schemes.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

As electronic transaction technologies continue to evolve, particularly with the rise of mobile computing devices in recent years, data security has become more important than ever. As a result, an approach known as tokenization has been employed in order to protect consumers' sensitive data. For example, when a consumer conducts a mobile transaction involving a payment, instead of submitting the consumer's sensitive financial information such as a real credit card number, an electronic or digital "token" (hereinafter referred to as token for reasons of simplicity) is generated to serve as a proxy for the real credit card number. The token may be generated from random numbers but may appear and function as an equivalent to the real credit card number. If the token is compromised (e.g., intercepted by a hacker), it would not otherwise affect the consumer's real credit card number, since a different token may be generated the next time the consumer makes a payment and the real credit card number cannot be obtained from the token by the hacker. In this manner, tokenization can safeguard the consumer's sensitive information. Due to these benefits, various tokenization schemes or standards such as the EMV (EUROPAY®, MASTERCARD®, and VISA®) tokenization standard have been steadily gaining adoption in the marketplace.

However, existing tokenization schemes may still have shortcomings. For example, a payment vault may create more than one token for a given user for multiple transactions involving the user. Each token may then have to be routed separately through the various entities of a tokenization network before the associated transaction can be successfully completed. This is inefficient, since the routing of tokens still demands network and computer resources. The separate routing of multiple tokens through the tokenization network (via multiple "network hops") requires more resources than routing the tokens on a single network hop.

According to the various aspects of the present disclosure, the routing of multiple tokens that are associated with a single user may be consolidated into a single network hop. For example, information regarding different transactions may be retrieved by a token service provider. The information may include, but is not limited to, user information, device information, temporal information, location information, etc. The token service provider may compare the retrieved information for the different transactions to determine whether the transactions are related. If the transactions are determined to be sufficiently related, for example based on a relatedness score that exceeds a predetermined threshold, the token service provider may consolidate the routing of the tokens corresponding to the different transactions. For example, the routing of the tokens may be performed in a single network hop, or via a single transmission from a token vault to one or more user devices. The various aspects of the present disclosure will now be discussed in more detail below with reference to FIGS. 1-5.

Figure 1:
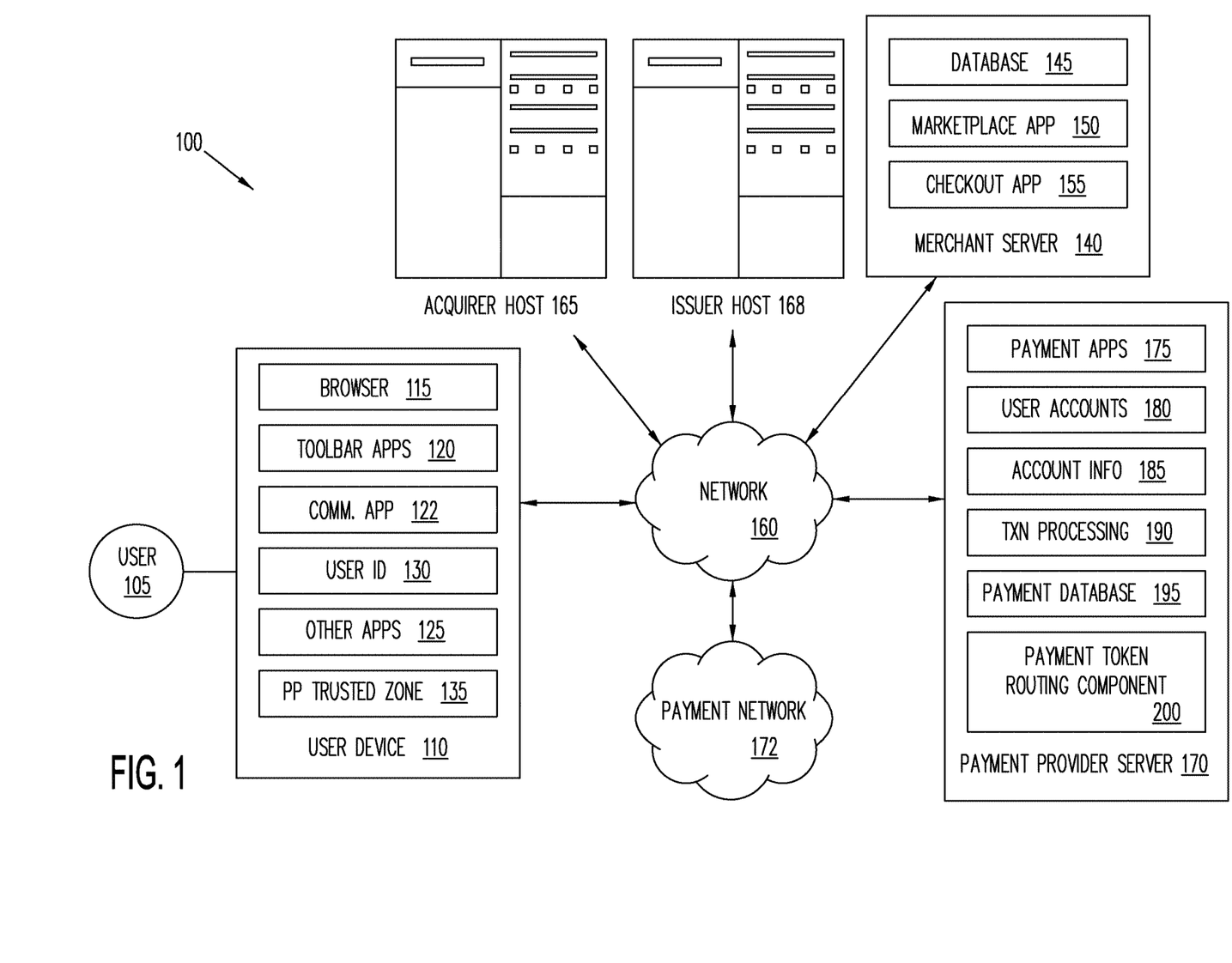
FIG. 1 is block diagram of a networked system suitable for implementing a tokenization scheme according to various aspects of the present disclosure.

FIG. 1 is block diagram of a networked system suitable for implementing the optimized tokens according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. Payment provider server 170 may be maintained by a payment service provider, such as PayPal, Inc. of San Jose, CA. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an IPAD® from APPLE®.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications 125 to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100. In conjunction with user identifiers 130, user device 110 may also include a trusted zone 135 owned or provisioned by the payment service provider with agreement from device manufacturer. The trusted zone 135 may also be part of a telecommunications provider SIM that is used to store appropriate software by the payment service provider capable of generating secure industry standard payment credentials as a proxy to user payment credentials based on user 105's credentials/status in the payment providers system/age/risk level and other similar parameters.

User device 110 may install and execute a payment application received from the payment service provider to facilitate payment processes. The payment application may allow a user to send payment transaction requests to the payment service provider. In particular, the payment application may authenticate user 105 before making payments. In an embodiment, the payment application may implement automatic authentication of the user 105 when the user 105 is at certain payment locations. The payment application in conjunction with the payment service provider may also provide proxies for user's credentials and funding instrument (e.g., payment and identity proxies for transaction) within the trusted zone 135 to be used with/without further authentication with payment service provider depending on the transaction or payment situation. The payment application may also receive relevant payment and identity proxies from proximity based ancillary systems such as a Bluetooth beacon installed in the merchant's premises in association with the payment service provider for the purpose of processing transactions or providing value added services to the user.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 360 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Account information may also include user purchase history and user ratings. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Payment application 175 may be further configured to determine the existence of and to manage accounts for user 105, as well as create new accounts if necessary.

In one embodiment, payment provider server 170 may include a token vault storing various information on token formats, conventions, data, and the like. For example, a token may be generated for a user's payment account to allow payment transactions using the token. A user's identity information, preferences, or other information may be stored and associated with the user's account and mapped to tokens. Merchant accounts at the payment provider server 170 also may store merchant's information, such as type of merchant, product or service offered, method of payments, and the like to ensure diversified use of tokens that may vary by merchant type/service etc.

Payment network 172 may be operated by payment card service providers or card associations, such as DISCOVER®, VISA®, MASTERCARD®, AMERICAN EXPRESS®, ALIPAY®, etc. The payment card service providers may provide services, standards, rules, and/or policies for issuing various payment cards. A network of communication devices, servers, and the like also may be established to relay payment related information among the different parties of a payment transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at various merchants who agreed to accept the payment card.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

As discussed above, traditional tokenization schemes may require unique tokens to be generated and routed separately for each transaction, even if these transactions originate from the same user. This scheme is an inefficient use of network and computer resources. According to the various aspects of the present disclosure, the payment provider server 170 may implement a token routing component 200 to determine whether tokens from separate transactions can be consolidated and routed together in a single network hop. For example, a user may conduct two transactions using two devices within a short time span of each other. Conventional tokenization schemes would have separately routed the tokens associated with these transactions. However, the token routing component 200 may cache the user account meta data and device reference data to orchestrate token routing accordingly. When one or more predefined criteria are met (e.g., the transactions originate from the same user or user account, use the same financial instrument, are processed by the same payment processor, and/or occur within a predetermined time frame), the token routing component 200 may consolidate the token routing such that the tokens from the two different transactions are routed together in a single network hop. This will be discussed below in more detail with reference to FIG. 2.

Figure 2:
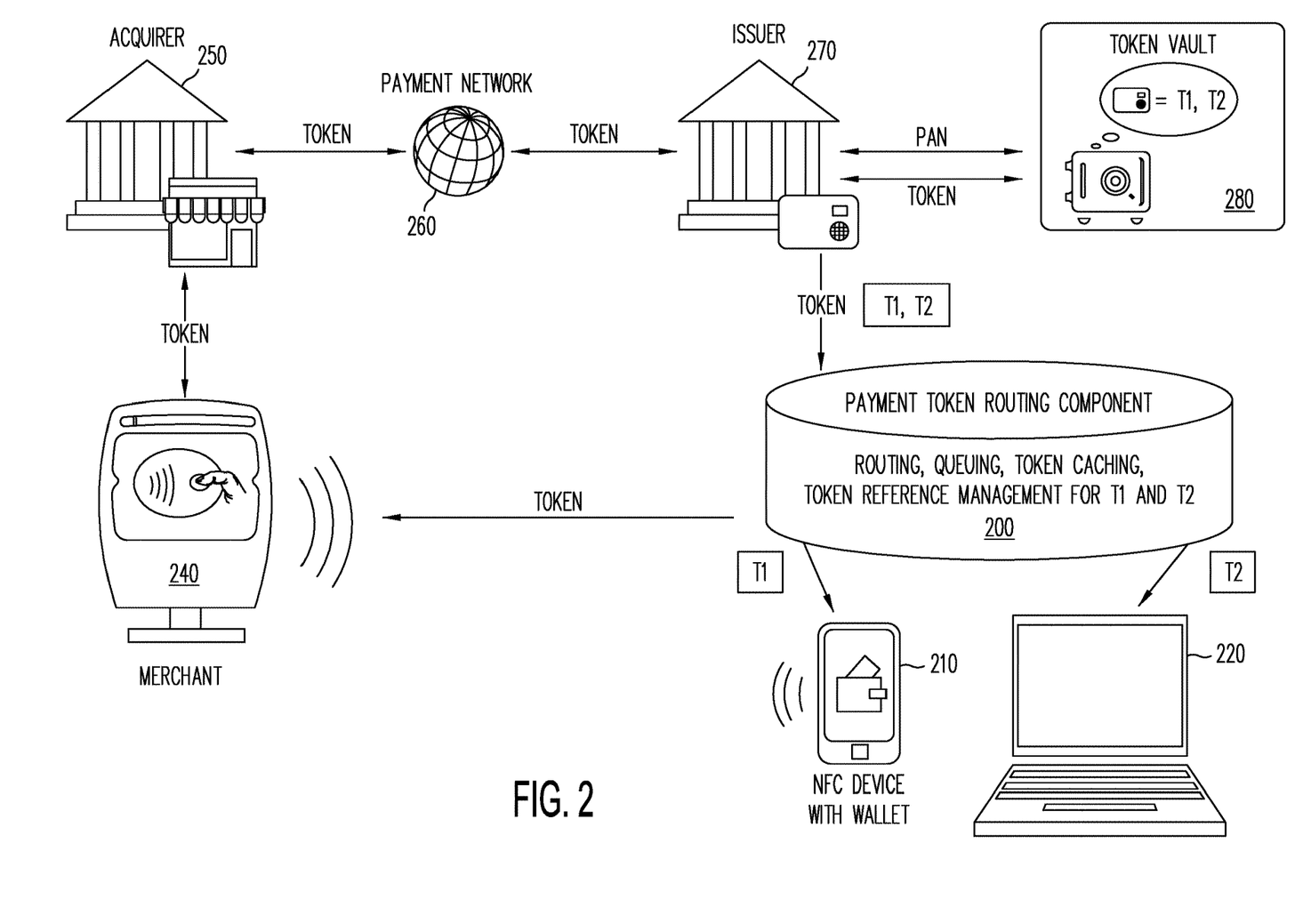
FIG. 2 is a diagram illustrating a consolidated token routing scheme according to various aspects of the present disclosure.

FIG. 2 illustrates a simplified block diagram of the tokenization approach according to an embodiment of the present disclosure. As an example, a given user A may initiate a first transaction on a first merchant's website using a mobile device 210 (e.g., a smartphone or a tablet computer) of the user A. The first transaction may include an order for a product or service, for example. The first transaction may be initiated at 10:10:10 AM, and the underlying payment instrument is a credit card of user A ending with digits 1011. Suppose that at time 10:10:11 (nearly around the same time that the first transaction was initiated on the first merchant's website), the user A initiates a second transaction on a second merchant's website. The second transaction may include a payment for a bill, such as an insurance bill, for example. The second transaction is initiated using a laptop computer 220, but the underlying payment instrument (the credit card ending with digits 1011) may still be the same as the first transaction. Furthermore, in one embodiment, the laptop computer 220 may also be associated with the user A.

According to various aspects of the present disclosure, the token routing component 200 is configured to determine whether the two transactions are sufficiently related so that the routing of the tokens associated with them should be consolidated, for example routed together in a single network hop. For example, the token routing component 200 receives and caches the user account meta data and device reference data. The user account meta data may include, but is not limited to: a user's real name and/or address, a first username of the user for conducting transactions with the first merchant, a first shopping history of the user with the first merchant, a first payment instrument of the user associated with the first merchant, a second username of the user for conducting transactions with the second merchant, a second shopping history of the user with the second merchant, a second payment instrument of the user associated with the second merchant, an email address of the user, a phone number of the user, an employer of the user, an occupation of the user, a birthdate or birth place of the user, a hobby of the user, the user's credit history or credit score, the user's shopping preferences (indicated by the user or determined by the token routing component 200 or by other automated analytical computer modules), or even the user's biometric information such as fingerprints, heart rate, blood pressure, etc. The device reference data may be the device reference data of either the device 210 or the device 220 and may include, but is not limited to: an IP (Internet Protocol) address, a MAC (Media Access Control) address, a UUID (Universally Unique Identifier), a UDID (Unique Device Identifier), an Internet browser type, etc.

Based on the user account meta data and device reference data, the token routing component 200 may be able to determine whether the two transactions are sufficiently related. For example, the user account meta data may indicate that the two transactions share the same name and address of the user (e.g., buyer of a good/service), and therefore the token routing component 200 may determine that the two transactions originated from the same user or at least the same user account, where multiple people (e.g., husband and wife, parents and children) are allowed to use the same user account. As such, the two transactions may be sufficiently related. As another example, the device reference data may indicate that the two transactions share the same device ID, the same IP address, the same MAC address, and/or similar GPS (Global Positioning System) coordinates, and therefore the token routing component 200 may determine that the two transactions originated from the same user device, or from two authorized user devices of the user. As such, the two transactions may be sufficiently related.

In some embodiments, the token routing component 200 may also retrieve and analyze temporal information of the transactions to determine the relatedness of the transactions. For example, even if the token routing component 200 has already determined that two transactions originate from the same user account or from one or more user devices of the user, the token routing component 200 may still restrict the related transactions to transactions that occur within a predefined timeframe (e.g., within 20 minutes or each other). Thus, if a first transaction occurs on day 1 but a second transaction occurs on day 2, the token routing component 200 may determine that these two transactions are not sufficiently related to each other even if they originated from the same user account and/or the same user device(s). Since the two transactions occur too far apart from each other temporally, the potential benefits achieved by consolidating the routing of the tokens associated with the respective transactions may not outweigh the inconvenience of delaying the token routing of the earlier transaction until the later transaction has occurred. As such, it may not make sense to postpone the token routing of the earlier transaction by an extra day just to conserve electronic resources with respect to token routing. Another factor used in determining whether to consolidate the routing is the type of purchase for the first transaction. For example, if the purchase is for digital content that may be needed right away, such as right before the user is boarding a plane or losing Internet connection, the token routing for the first transaction may be performed without the delays associated with determining whether a subsequent second transaction should have its token sent at the same time. In some embodiments, such a determination may be performed using a transaction category identifier. For example, each transaction may have a category identifier that identifies what type of transaction it is (e.g., mobile media consumption, electronic gaming, purchase of a virtual product, purchase of a tangible product, purchase of a service, bill payment, etc.). Of course, it is understood that any given transaction need not be limited to just one transaction category identifier, and some transactions may have multiple transaction identifiers. The token routing component 200 may retrieve the transaction category identifiers of a transaction and compare them to the transaction category identifiers in an electronic database. The electronic database may list a first group of transaction category identifiers for which the token routing shall not be delayed, as well as a second group of transaction category identifiers for which the token routing delay is acceptable. Thus, by comparing the retrieved transaction category identifiers of a transaction with the transaction category identifiers of the electronic database, the token routing component 200 may determine whether to delay the token routing of any given transaction.

It is understood that the token routing component 200 may dynamically configure the temporal restrictions from transaction to transaction. For certain sets or kinds of transactions, such as transactions that need to be completed more urgently (e.g., electronic wiring of funds or paying a bill) or transactions with larger monetary values, the token routing component 200 may specify a tighter temporal time window within which the latter transaction needs to occur for their token routing to be consolidated. For example, the two transactions may need to occur within minutes or seconds of each other in order for their token routing to be consolidated. For certain other sets or kinds of transactions, such as transactions that do not need to be completed more urgently (e.g., buying a product/service) or transactions with smaller monetary values, the token routing component 200 may specify a lengthier temporal time window within which the latter transaction needs to occur for their token routing to be consolidated. For example, as long as these transactions occur within 24 hours of each other, or within the same calendar day, then their token routing can be consolidated. Data about the user, such as location and date, can also be used to determine a temporal time window. For example, if based on user history, user or user device location, and calendar information, the user is expected to be making last minute purchases for an anniversary, a birthday, or for travel, the window may be longer, as the user may be expected to be making multiple purchases at a location, such as a merchant location or a user location. In some embodiments, the token routing component 200 may evaluate the urgency of completing a transaction at least in part based on the transaction category identifier as well. As discussed above, the token routing component 200 may compare the retrieved transaction category identifier with the transaction category identifiers in an electronic database, which may list a first group of transactions as needing to be completed most urgently (e.g., within 1 minute), a second group of transactions as needing to be completed with moderate urgency (e.g., within 1 hour), and a third group of transactions as needing to be completed with the least amount of urgency (e.g., within 24 hours). Of course, there can be many more groups (e.g., more than 3) of transactions that each have a respective urgency level. Based on the results of the comparison, the token routing component 200 may specify the length of the temporal time windows. For example, if a transaction's transaction category identifier matches that of the second group of transactions discussed above, the token routing component 200 may set the length of the temporal time window to be 1 hour.

In some embodiments, the token routing component 200 may use a scoring system to determine whether different transactions are sufficiently related. For example, two transactions may initially start with a relatedness score of 0. If the token routing component 200 determines that the two transactions originated from the same user account, it will raise the relatedness score by a predefined amount. If the token routing component 200 determines that the two transactions originated from the same user device, it will raise the relatedness score by a predefined amount. If the token routing component 200 determines that the two transactions originated from different user devices, but that these different user devices are each an authorized device of the same user, it will raise the relatedness score by a predefined amount. If the token routing component 200 determines that the two transactions occurred within a predefined timeframe, it will raise the relatedness score by a predefined amount. In some embodiments, the closer the time the two transactions occurred from each other, the higher the relatedness score may be raised. Vice versa, the farther apart the time the two transactions occurred from each other, the lower the relatedness score should be raised, and it may even be lowered in some embodiments. For example, if the time period between two transactions is longer than a first predefined time period (e.g., longer than 2 hours), the relatedness score may be lowered by a predefined number (e.g., by 1 point). If the time period between two transactions is longer than a second predefined time period (e.g., longer than 24 hours), the relatedness score may be dropped to 0, regardless of the relatedness based on the user identities, user devices, etc.

The above are non-limiting examples of how the user account meta data, device reference data, and/or temporal data of the transactions can be used to calculate the relatedness score. When the relatedness score exceeds a predefined threshold, the token routing component 200 may determine that the transactions are sufficiently related to warrant consolidated token routing for the transactions. Otherwise, the token routing component 200 may deem the transactions as not being sufficiently related, and thus the token routing should still be performed separately for the transactions.

Using the scenario of FIG. 2 discussed above as an example, the first and second transactions are conducted by the same user, thereby raising the relatedness score. In addition, although the first and second transactions originated from different user devices 210 and 220, respectively, the token routing component 200 may determine that the two devices 210 and 220 are both authorized devices of the same user, for example based on their common IP addresses or similar GPS coordinates (indicating that the devices are located within a few meters of each other). Hence, the token routing component 200 may still raise the relatedness score. Furthermore, the token routing component 200 may also raise the relatedness score based on the close timespan within which the first and second transactions occurred (e.g., within a few minutes or each other). Based on these determinations, the token routing component 200 may determine that a cumulative or overall relatedness score exceeds a predefined threshold for relatedness. Therefore, the token routing component 200 may determine that the token routing for the first and second transactions should be consolidated.

Still referring to FIG. 2, it is understood that tokens may have already been generated to be associated with the user account and/or the user device(s) prior to the initiation of the transactions. For example, the user may have enrolled a VISA® account with a digital payment service (e.g., an online retailer or a mobile wallet) by entering the user's primary account number (PAN), security code, and other payment account information. The digital payment service provider then requests a payment token from VISA® for the enrolled account. VISA® then shares the token requests with the account issuer (e.g., the consumer's bank). With the account issuer's approval, VISA® replaces the user's PAN with a unique digital identifier—the token. VISA® shares the token with the token requestor for online and mobile (e.g. NFC) payment use. In some embodiments, a payment token can be limited to one or more specific user devices, one or more specific merchants, or even a specific number of purchases (e.g., a limit of 5 purchases) before expiration.

In the embodiment shown in FIG. 2, a first transaction originates from the device 210 with a first merchant, and a second transaction originates from the device 220 with a second merchant. Both the first merchant and the second merchant may be visually represented by the merchant 240 in FIG. 2, though it is understood that the first merchant and the second merchant may or may not be the same merchant. The first and second transactions may also be different types of transactions. For example, the first transaction may be an NFC transaction, while the second transaction may be an online transaction conducted via the Internet. However, this is merely for illustrative purposes, and that the first and second transactions may each comprise a plurality of types of transactions in various embodiments. In any case, the token routing component 200 (e.g., operated by a token service provider) may retrieve or otherwise access data pertaining to the first and second transactions at this stage. The data may include, but is not limited to, temporal data (e.g., the point in time at which the first and/or second transactions are originated), user data (e.g., the person or user initiating the first and/or second transactions), or device data (e.g., the device ID of the devices 210 and/or 220, the IP addresses of the devices 210 and/or 220, the GPS coordinates of the devices 210 and/or 220, the network address associated with devices 210 and/or 220, etc.).

A first token T1 is generated for the first transaction, and a second token T2 is generated for the second transaction. As discussed above, in some embodiments, the tokens T1 and/or T2 may have already been generated before the first transaction and/or the second transaction were initiated. These tokens T1 and/or T2 may be preloaded onto a device or onto a network for use at a later time, for example. In other embodiments, the tokens T1 and/or T2 may be generated dynamically, for example the token T1 may be generated in response to the initiation of the first transaction, and the token T2 may be generated in response to the initiation of the second transaction.

The token T1 or T2 may each be generated from random numbers and exist in software. In some embodiments, the token T1 or T2 may each serve as a proxy for a user's payment account, such as a payment provider user account, e.g., a 8 to 19-digit numeric value which passes basic validation rules of an account number along with discretionary data in industry standard track 1 and track 2 formats that may have information pertaining to additional value added services such as identity assurance, loyalty, Internet of Things (IoT), etc. The token T1 or T2 may also be generated within a BIN/IIN range that has been designated as a token BIN/IIN range and flagged accordingly in all appropriate BIN/IIN tables. The validity of the tokens may be set in real time or at an account level via a backend policy applied on the BIN/IIN.

The merchant 240 may send the tokens T1 and T2 to the acquirer 250 as a part of an authorization request. The merchant 240 may be an entity operating the merchant server 140 of FIG. 1, and the acquirer 250 may be an embodiment of the acquirer host 165 of FIG. 1. Information related to the first transaction and the second transaction may be passed along to the acquirer 250. The acquirer 250 may then process the transaction information and pass the tokens T1 and T2 along with the transaction information to an appropriate payment network 260. As examples, the payment network may include entities such as VISA®, Mastercard®, American Express®, or Discover®. The payment network 260 may further process the tokens T1 and T2. The payment network 260 then sends the tokens T1 and T2, along with the transaction information, to the issuer 270 for authorization. The issuer 270 may be an embodiment of the issuer host 168 of FIG. 1. The issuer 270 may access a token vault 280—which may be operated by the token service provider—to verify the details of the transaction. For example, the issuer 270 may pass the tokens T1 and T2 to the token vault 280, and in response, the token vault 280 may return the account details (e.g., primary account number, or PAN) to the issuer 270. The issuer 270 may then accept or decline the transactions.

As discussed above, the token routing component 200 determines the relatedness of the first and second transactions. If the transactions are determined to be related enough (e.g., having a relatedness score exceeding a predefined threshold), then the routing of the tokens T1 and T2 may be consolidated. For example, in response to the issuer 270 accepting the first and second transactions, the token routing component 200 may route the tokens T1 and T2 simultaneously from the token vault 280 to the devices 210 and 220 in a single transmission, rather than routing the tokens T1 and T2 separately in two separate transmissions. In embodiments where the first transaction and the second transaction originate from two different devices 210 and 220 (e.g., as shown in the embodiment of FIG. 2), the token T1 is routed to the device 210 from the token vault 280 at the same time that the token T2 is routed to the device 220 from the token vault 280, as a part of the consolidated single transmission. Note that although the tokens are transmitted to two separate user devices, this may still be considered a "single hop", as the request meta data/payload aggregation still goes through a single hop. In embodiments where the first transaction and the second transaction originate from the same device (e.g., both from the device 210, or both from the device 220), the tokens T1 and T2 are simultaneously routed to the device as a part of the consolidated single transmission. It is also understood that the notion of a hop is relative to the usage of payment network resources such as token service provider, acquirer, merchant, bank, etc. A network hop means that a token or multiple tokens are generated based on a "single" payload request. It is possible for a token or multiple tokens to be generated based on a "single" payload request, where the token or multiple tokens are routed to multiple devices (e.g., merchant devices and/or user devices). It is understood that although the aspects of the present disclosure are illustrated using two transactions (and therefore two separate tokens T1 and T2), the present disclosure may apply to three or more transactions as well.

Though the discussions above pertain to the routing of two separate tokens (one token for each transaction), it is understood that the tokens may be consolidated into a single token in some embodiments. For example, the token routing component 200 may determine that two or more separate transactions are originated from the same user account, with the same merchant, and within a very short temporal time frame (e.g., less than 2 minutes) of one another. In that case, the token routing component 200 may combine the multiple tokens (e.g., one separate token for each transaction) into a single token. The consolidation of tokens may reduce consumption of electronic resources.

Figure 3:
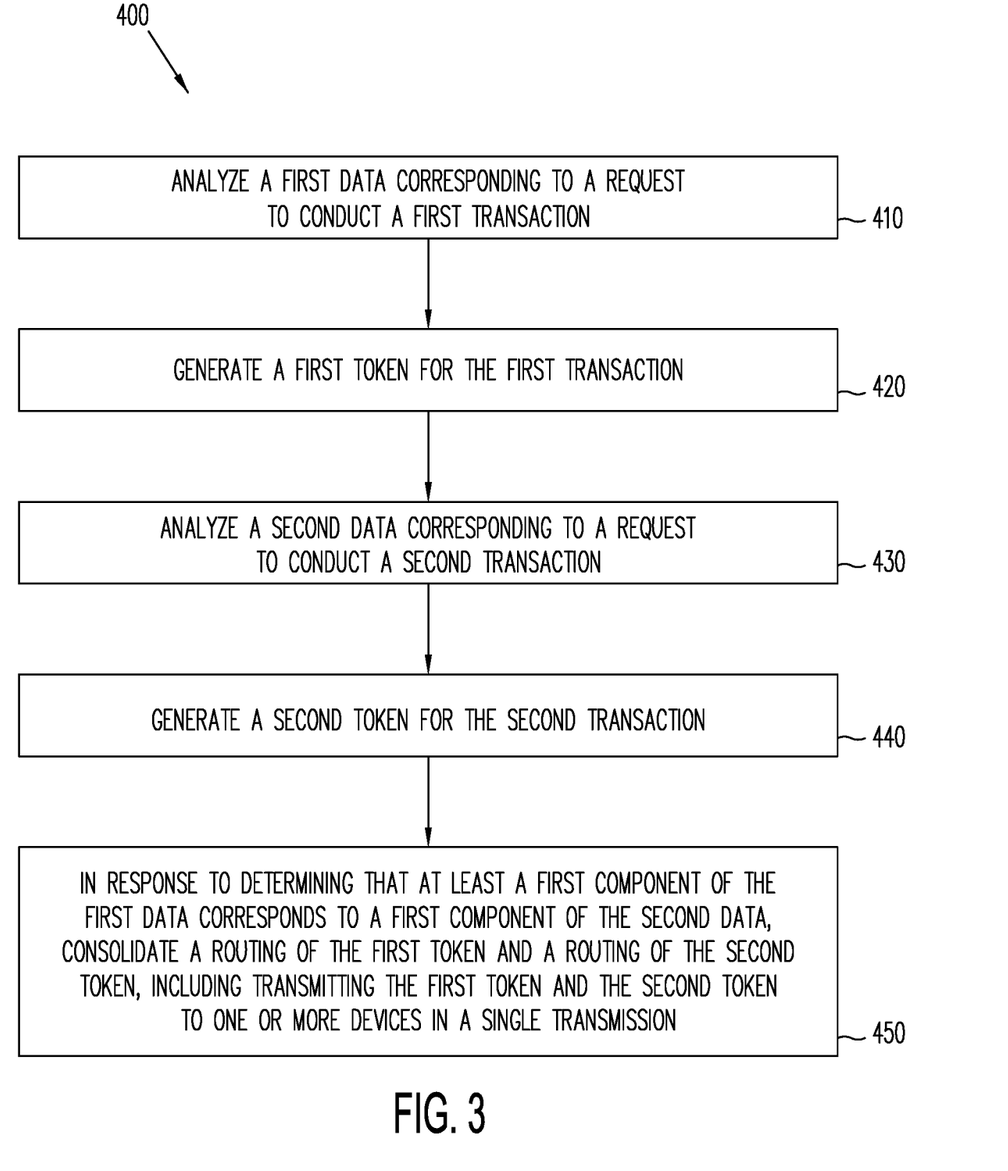
FIG. 3 is a flowchart of a method of consolidating token routing according to various aspects of the present disclosure.

FIG. 5 is a flowchart illustrating a method 400 of tokenization according to various aspects of the present disclosure. In some embodiments, the steps of the method 400 are performed by one or more hardware processors of a token service provider.

The method 400 includes a step 410, in which first data is analyzed, the first data corresponding to a request to conduct a first transaction.

The method 400 includes a step 420, in which a first token is generated for the first transaction. In the next step (not shown), which can occur after step 410 or step 420, a time window is determined as to how long the system should wait for a second transaction to be received in order to determine whether there should be a token transmission in a single consolidated transmission for the two transactions. As discussed above, the time or temporal time window maybe based on various data that can be used to determine the urgency of the first transaction and whether a related transaction is expected to occur within a certain time period.

The method 400 includes a step 430, in which second data is analyzed, the second data corresponding to a request to conduct a second transaction within a determined time after the request to conduct the first transaction is received.

The method 400 includes a step 440, in which a second token is generated for the second transaction.

The method 400 includes a step 450, in which in response to determining that at least a first component of the first data corresponds to a first component of the second data, a routing of the first token and a routing of the second token are consolidated. In some embodiments, the consolidation comprises transmitting the first token and the second token to one or more devices in a single transmission.

In some embodiments, the analyzing of the first data comprises analyzing first temporal data associated with the first transaction as the first component of the first data, the analyzing of the second data comprises analyzing second temporal data associated with the second transaction as the first component of the second data, and the determining comprises determining, based on the analyzing the first temporal data and the analyzing the second temporal data, that the first transaction and the second transaction are conducted within a predefined timeframe.

In some embodiments, the analyzing of the first data comprises analyzing first user data associated with the first transaction as the first component of the first data, the analyzing of the second data comprises analyzing second user data associated with the second transaction as the first component of the second data, and the determining comprises determining, based on the analyzing the first user data and the analyzing the second user data, that the first transaction and the second transaction are conducted via a same user account.

In some embodiments, the analyzing of the first data comprises analyzing first device data as the first component of the first data, the first device data including data associated with a first device from which the first transaction originates; the analyzing of the second data comprises analyzing second device data as the first component of the second data, the second device data including data associated with a second device from which the second transaction originates; and the determining comprises determining, based on the analyzing of the first device data and the analyzing of the second device data, that the first device and the second device are a same user device or are two separate devices sharing a common user.

In some embodiments, the analyzing of the first device data comprises accessing first global positioning system (GPS) data of the first device; the analyzing of the second device data comprises accessing second GPS data of the second device; and the determining comprises determining, based on the first GPS data and the second GPS data, that the first device and the second device are not the same device but are located within a predefined distance from each other.

In some embodiments, the analyzing of the first device data comprises accessing a first device identifier, a first network identifier, or a first Internet Protocol (IP) address associated with the first device; the analyzing of the second device data comprises accessing a second device identifier, a second network identifier, or a second IP address associated with the second device; and the determining comprises determining, based on a comparison of the first device identifier with the second device identifier, a comparison of the first network identifier with the second network identifier, or a comparison of the first IP address with the second IP address, that the first device and the second device are the same device.

In some embodiments, the first transaction request is received from a first device, the second transaction request is received from a second device, and the transmitting comprises simultaneously transmitting the first token and the second token to the first device and the second device, respectively. In some embodiments, the transmitting comprises simultaneously routing the first token and the second token from a token vault to the first device and the second device.

In some embodiments, the first transaction request and the second transaction request are both received from a same user device, and the transmitting comprises simultaneously transmitting the first token and the second token to the user device. In some embodiments, the transmitting comprises simultaneously routing the first token and the second token from a token vault to the user device.

It is understood that additional method steps may be performed before, during, or after the steps 410-450 discussed above. For example, in some embodiments, the method 400 may further include a step of calculating a relatedness score between the first transaction and the second transaction, and a step of determining, based on the relatedness score, that at least the first component of the first data corresponds to the first component of the second data. It is also understood that one or more of the steps of the method 400 described herein may be omitted, combined, or performed in a different sequence as desired.

Based on the above discussions, it can be seen that the present disclosure offers several significant advantages over conventional methods and systems. It is understood, however, that not all advantages are necessarily discussed in detail herein, different embodiments may offer different advantages, and that no particular advantage is required for all embodiments. One advantage is improved functionality of a computer. For example, network resources are needed to route tokens, and the routing of each token consumes network resources. Here, by consolidating the routing of multiple tokens via a single network hop, network resources are conserved. In addition, the consolidated routing of multiple tokens reduces computer processing resources and electronic memory (e.g., random access memory). Furthermore, since the individual routing of tokens expends battery resources (e.g., battery of the devices 210 and 220), the consolidated token routing may reduce battery consumption. Other advantages include compatibility with existing tokenization systems and ease and low cost of implementation.

Figure 4:
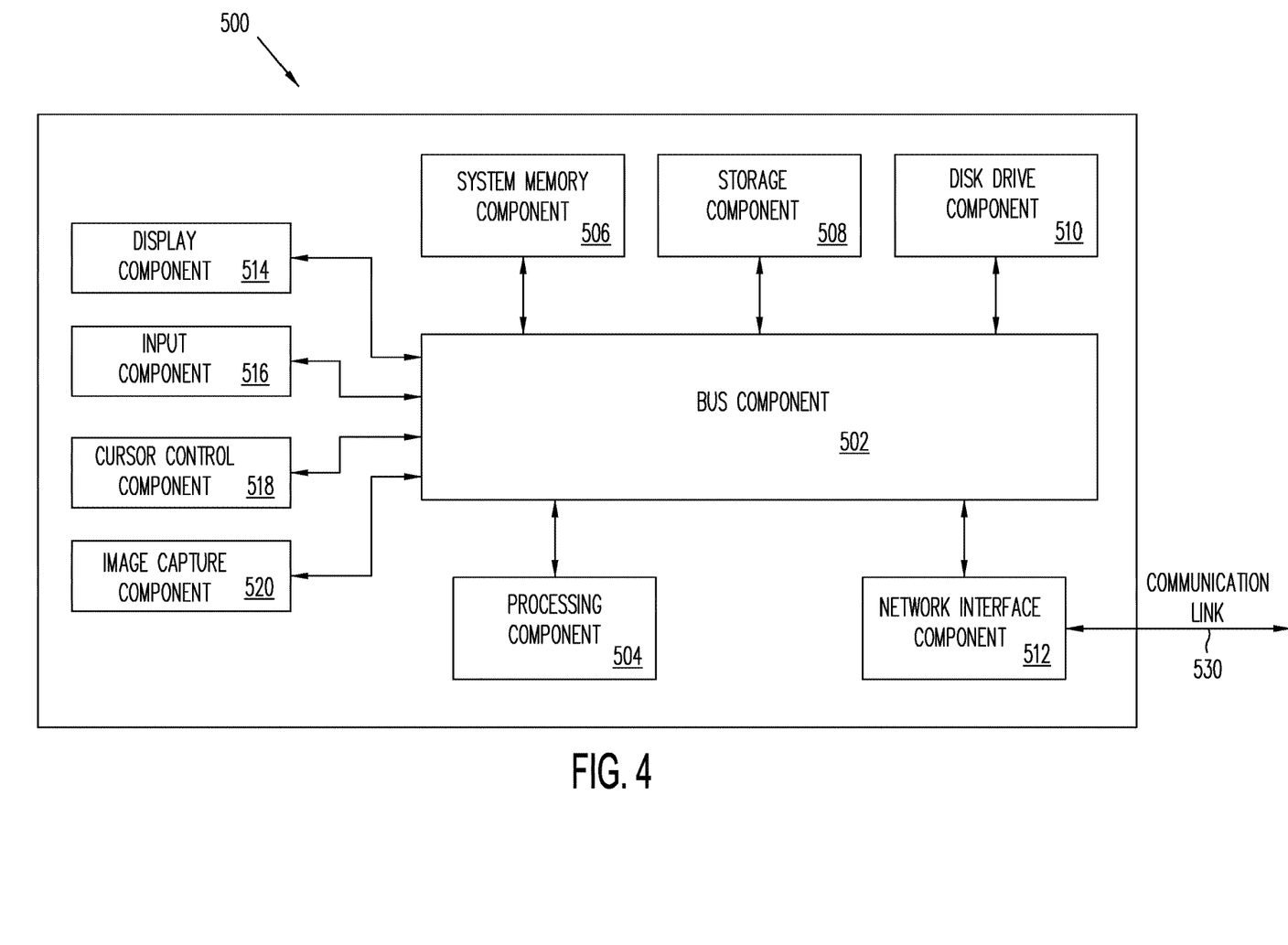
FIG. 4 is a block diagram of a computer system suitable for implementing one or more components in FIG. 1 according to various aspects of the present disclosure.

FIG. 4 is a block diagram of a computer system 500 suitable for implementing various methods and devices described herein, for example, the token routing component 200 and the various method steps of the method 400, or the devices 210 or 220, the merchant server 140, or the payment provider server 170. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the token routing component 200 and the various method steps of the method 400 (or the devices 210 or 220, the merchant server 140, or the payment provider server 170) may be implemented as the computer system 500 in a manner as follows.

In accordance with various embodiments of the present disclosure, the computer system 500, such as a network server or a mobile communications device, includes a bus component 502 or other communication mechanisms for communicating information, which interconnects subsystems and components, such as a computer processing component 504 (e.g., processor, micro-controller, digital signal processor (DSP), etc.), system memory component 506 (e.g., RAM), static storage component 508 (e.g., ROM), disk drive component 510 (e.g., magnetic or optical), network interface component 512 (e.g., modem or Ethernet card), display component 514 (e.g., cathode ray tube (CRT) or liquid crystal display (LCD)), input component 516 (e.g., keyboard), cursor control component 518 (e.g., mouse or trackball), and image capture component 520 (e.g., analog or digital camera). In one implementation, disk drive component 510 may comprise a database having one or more disk drive components. In some embodiments, the token routing component 200 may also be implemented at least partially within the system memory component 506 or the disk drive component 510.

In accordance with embodiments of the present disclosure, computer system 500 performs specific operations by the processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of (or in combination with) software instructions to implement the present disclosure. In some embodiments, the various components of the token routing component 200 (e.g., the execution engine 230) may be in the form of software instructions that can be executed by the processor 504 to automatically perform context-appropriate tasks on behalf of a user.

Logic may be encoded in a computer readable medium, which may refer to any medium that participates in providing instructions to the processor 504 for execution. Such a medium may take many forms, including but not limited to, non-volatile media and volatile media. In one embodiment, the computer readable medium is non-transitory. In various implementations, non-volatile media includes optical or magnetic disks, such as disk drive component 510, and volatile media includes dynamic memory, such as system memory component 506. In one aspect, data and information related to execution instructions may be transmitted to computer system 500 via a transmission media, such as in the form of acoustic or light waves, including those generated during radio wave and infrared data communications. In various implementations, transmission media may include coaxial cables, copper wire, and fiber optics, including wires that comprise bus 502.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. These computer readable media may also be used to store the data regarding the transactions, for example.

In various embodiments of the present disclosure, execution of instruction sequences to practice the present disclosure may be performed by computer system 500. In various other embodiments of the present disclosure, a plurality of computer systems 500 coupled by communication link 530 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information and instructions, including one or more programs (i.e., application code) through communication link 530 and communication interface 512. Received program code may be executed by computer processor 504 as received and/or stored in disk drive component 510 or some other non-volatile storage component for execution. The communication link 530 and/or the communication interface 512 may be used to conduct electronic communications between the token routing component 200 and external devices, for example with the user device 110, with the merchant server 140, or with the payment provider server 170, depending on exactly where the token routing component 200 is implemented.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein. It is understood that at least a portion of the token routing component 200 may be implemented as such software code.

Figure 5:
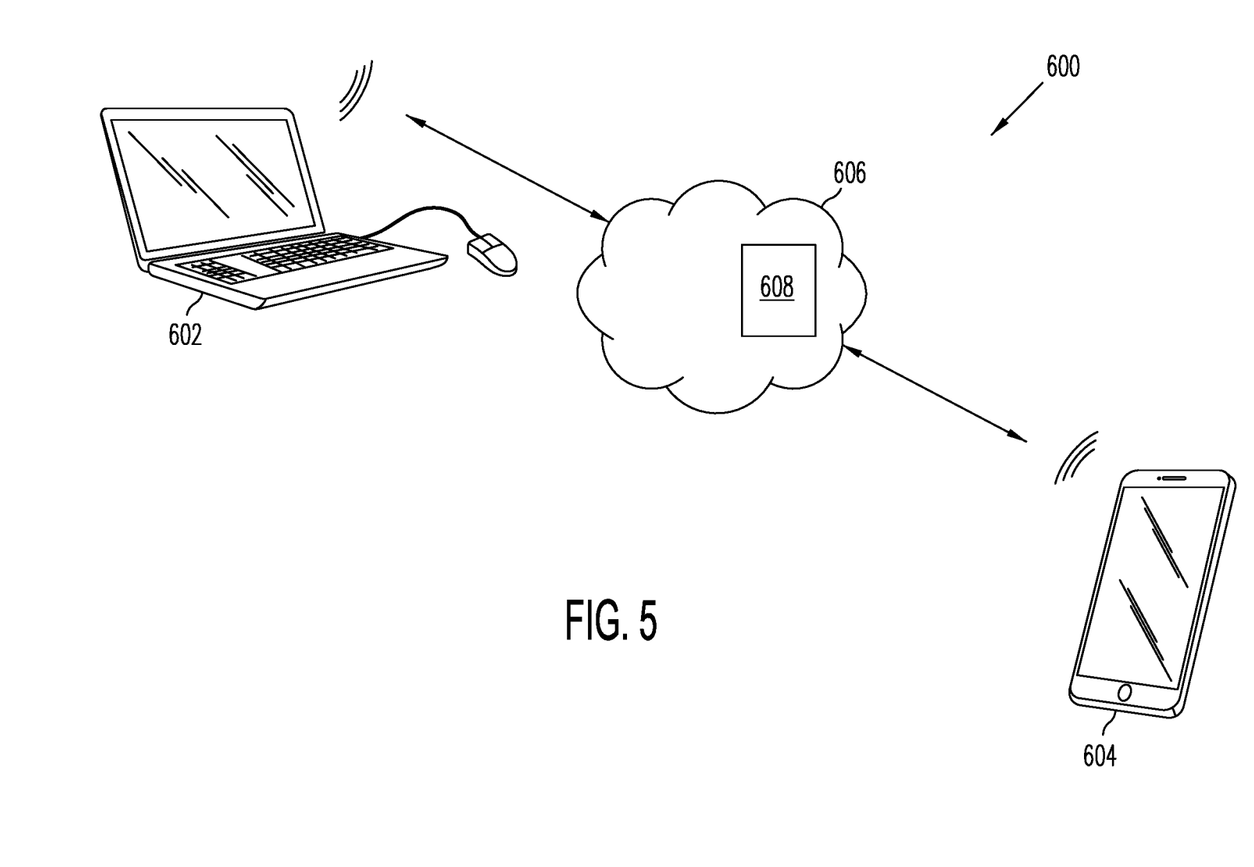
FIG. 5 is a diagram illustrating an example cloud computing architecture according to various aspects of the present disclosure.

FIG. 5 illustrates an example cloud-based computing architecture 600, which may also be used to implement various aspects of the present disclosure. The cloud-based computing architecture 600 includes a mobile device 604 (e.g., the user device 110 of FIG. 1 or the devices 210 or 220 of FIG. 2) and a computer 602 (e.g., the merchant server 140 or the payment provider server 170), both connected to a computer network 606 (e.g., the Internet or an intranet). In one example, a consumer has the mobile device 604 that is in communication with cloud-based resources 608, which may include one or more computers, such as server computers, with adequate memory resources to handle requests from a variety of users. A given embodiment may divide up the functionality between the mobile device 604 and the cloud-based resources 608 in any appropriate manner. For example, an app on mobile device 604 may perform basic input/output interactions with the user, but a majority of the processing and caching may be performed by the cloud-based resources 608. However, other divisions of responsibility are also possible in various embodiments. In some embodiments, using this cloud architecture, the token routing component 200 may reside on the user device 110, but its functionalities can be accessed or utilized by the merchant server 140 or by the payment provider server 170. Similarly, the token routing component 200 may reside on the merchant server 140 or on the payment provider server 170, but its functionalities may be accessed or utilized by the user device 110.

The cloud-based computing architecture 600 also includes the personal computer 602 in communication with the cloud-based resources 608. In one example, a participating merchant or consumer/user may access information from the cloud-based resources 608 by logging on to a merchant account or a user account at computer 602. The system and method involving the tokenization scheme discussed above may be implemented at least in part based on the cloud-based computing architecture 600.

It is understood that the various components of cloud-based computing architecture 600 are shown as examples only. For instance, a given user may access the cloud-based resources 608 by a number of devices, not all of the devices being mobile devices. Similarly, a merchant or another user may access the cloud-based resources 608 from any number of suitable mobile or non-mobile devices. Furthermore, the cloud-based resources 608 may accommodate many merchants and users in various embodiments.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure involves a method that includes the following steps: analyzing first data corresponding to a request to conduct a first transaction; generating a first token for the first transaction; analyzing second data corresponding to a request to conduct a second transaction; generating a second token for the second transaction; and in response to determining that at least a first component of the first data corresponds to a first component of the second data, consolidating a routing of the first token and a routing of the second token, the consolidating including transmitting the first token and the second token to one or more devices in a single transmission.

Another one aspect of the present disclosure involves a system that includes a non-transitory memory and one or more hardware processors coupled to the non-transitory memory and configured to read instructions from the non-transitory memory to cause the system to perform operations comprising: analyzing, by a token service provider (TSP), first temporal data, first user data, or first device data corresponding to a first transaction request; generating, by the TSP, a first token for the first transaction; analyzing, by the TSP, second temporal data, second user data, or second device data corresponding to a second transaction request; generating, by the TSP, a second token for the second transaction; and in response to determining that the first temporal data is related to the second temporal data, the first user data is related to the second user data, or the first device data is related to the second device data, causing the first token and the second token to be simultaneously transmitted from a token vault to one or more devices from which the first transaction request and the second transaction request originated.

Yet another aspect of the present disclosure involves a non-transitory machine-readable medium having stored thereon machine-readable instructions executable to cause a machine to perform operations comprising: accessing, by a token service provider (TSP), first data corresponding to a first transaction request, the first data comprising first temporal data, first user data, or first device data; generating, by the TSP, a first token for the first transaction; accessing, by the TSP, second data corresponding to a second transaction request, the second data comprising second temporal data, second user data, or second device data; generating, by the TSP, a second token for the second transaction; comparing, by the TSP, the first temporal data with the second temporal data, the first user data with the second user data, or the first device data with the second device data; determining, based on the comparing, that a relatedness between the first transaction and the second transaction exceeds a predefined threshold; and consolidating, by the TSP and in response to the determining, a routing of the first token and a routing of the second token, the consolidating including transmitting the first token and the second token to one or more devices in a single transmission.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
   analyzing, via one or more hardware processors of a token service provider, first data corresponding to a request from a first device to conduct a first transaction, wherein the first data includes first global positioning system (GPS) data of the first device, a first device identifier identifying the first device, a first network identifier identifying a network of the first device, or a first Internet Protocol (IP) address of the first device;
   generating, via the one or more hardware processors, a first token for the first transaction;
   analyzing, via the one or more hardware processors, second data corresponding to a request from a second device to conduct a second transaction, wherein the second data includes second GPS data of the second device, a second device identifier identifying the second device, a second network identifier identifying a network of the second device, or a second IP address of the second device;
   generating, via the one or more hardware processors, a second token for the second transaction;
   making a first determination, based on a comparison of the first data and the second data, that the first device and the second device are a same user device or are two separate devices sharing a common user;
   making a second determination, based on a type of the first transaction, a type of the second transaction, first temporal data associated with the first transaction, and second temporal data associated with the second transaction, that a routing of the first token or a routing of the second token should be postponed until both the first token and the second token are ready for routing, wherein the making the second determination comprises determining that the first transaction and the second transaction are conducted within a predefined timeframe;
   in response to the making the first determination and the making the second determination, performing, via the one or more hardware processors, operations that comprise:
      postponing the routing of the first token or the routing of the second token until both the first token and the second token are ready for routing;
      based on the postponing, combining the first token and the second token into a single token; and
      transmitting the single token to one or more devices in a single transmission based on a single payload request.

2. The method of claim 1, wherein the analyzing the first data, the generating the first token, the analyzing the second data, or the generating the second token, are performed by a token routing component of the token service provider.

3. The method of claim 1, wherein:
   the analyzing the first data comprises analyzing first user data associated with the first transaction as a further component of the first data;
   the analyzing the second data comprises analyzing second user data associated with the second transaction as a further component of the second data; and
   the method further comprises determining, based on the analyzing the first user data and the analyzing the second user data, that the first transaction and the second transaction are conducted via a same user account.

4. The method of claim 1, wherein:
the making the first determination further comprises determining, based on a comparison of the first GPS data and the second GPS data, that the first device and the second device are not the same user device but are located within a predefined distance from each other.

5. The method of claim 1, wherein:
the making the first determination further comprises determining, based on a comparison of the first device identifier with the second device identifier, a comparison of the first network identifier with the second network identifier, or a comparison of the first IP address with the second IP address, that the first device and the second device are the same user device.

6. The method of claim 1, wherein:
the making the first determination further comprises determining that the first device and the second device are separate devices; and
the transmitting comprises simultaneously transmitting the single token to the first device and the second device.

7. The method of claim 6, wherein the transmitting further comprises simultaneously routing the single token from a token vault to the first device and the second device.

8. The method of claim 1, wherein:
the making the first determination further comprises determining that the first device and the second device are the same user device; and
the transmitting comprises simultaneously transmitting the single token to the same user device.

9. The method of claim 8, wherein the transmitting further comprises simultaneously routing the single token from a token vault to the same user device.

10. The method of claim 1, further comprising:
calculating a relatedness score between the first transaction and the second transaction, wherein the making the first determination is further based on the relatedness score.

11. A system, comprising:
a non-transitory memory; and
one or more hardware processors coupled to the non-transitory memory and configured to read instructions from the non-transitory memory to cause the system to perform operations comprising:
analyzing first data corresponding to a request from a first device to conduct a first transaction, wherein the first data includes first global positioning system (GPS) data of the first device, a first device identifier identifying the first device, a first network identifier identifying a network of the first device, or a first Internet Protocol (IP) address of the first device;
generating a first token for the first transaction, the first token configured to be routable at a first point in time;
analyzing second data corresponding to a request from a second device to conduct a second transaction, wherein the second data includes second GPS data of the second device, a second device identifier identifying the second device, a second network identifier identifying a network of the second device, or a second IP address of the second device;
generating a second token for the second transaction, the second token configured to be routable at a second point in time later than the first point in time;
determining, based on a comparison of the first data and the second data, that the first device and the second device are a same user device or are two separate devices sharing a common user;
determining, based on a type of the first transaction, a type of the second transaction, first temporal data associated with the first transaction, and second temporal data associated with the second transaction, that the first transaction and the second transaction are conducted within a predefined timeframe;
in response to a first determination that the first device and the second device are a same user device or are two separate devices sharing a common user and a second determination that the first transaction and the second transaction are conducted within a predefined timeframe, making a third determination that a routing of the first token should be postponed until the second point in time or later;
based on making the third determination, consolidating the routing of the first token and a routing of the second token, the consolidating including combining the first token and the second token into a single token; and
transmitting, on or after the second point in time, the single token to one or more devices in a single transmission based on a single payload request.

12. The system of claim 11, wherein the analyzing the first data, the generating the first token, the analyzing the second data, the generating the second token, and the consolidating are performed by one or more hardware processors of a token routing component of a token service provider.

13. The system of claim 11, wherein:
the analyzing the first data comprises analyzing first user data associated with the first transaction as a further component of the first data;
the analyzing the second data comprises analyzing second user data associated with the second transaction as a further component of the second data; and
the operations further comprise determining, based on the analyzing the first user data and the analyzing the second user data, that the first transaction and the second transaction are conducted via a same user account.

14. The system of claim 11, wherein:
the determining that the first device and the second device are a same user device or are two separate devices sharing a common user comprises determining, based on a comparison of the first GPS data and the second GPS data, that the first device and the second device are not the same user device but are two separate devices located within a predefined distance from each other.

15. The system of claim 11, wherein:
the determining that the first device and the second device are a same user device or are two separate devices sharing a common user further comprises determining, based on a comparison of the first device identifier with the second device identifier, a comparison of the first network identifier with the second network identifier, or a comparison of the first IP address with the second IP address, that the first device and the second device are the same user device.

16. A non-transitory machine-readable medium having stored thereon machine-readable instructions executable to cause a machine to perform operations comprising:
analyzing first data corresponding to a request from a first device to conduct a first transaction, wherein the first data includes first temporal data of the first transaction and at least one of: first global positioning system (GPS) data of the first device, a first device identifier identifying the first device, a first network identifier identifying a network of the first device, or a first Internet Protocol (IP) address of the first device;

generating a first token for the first transaction, the first token having a first scheduled routing time;

analyzing second data corresponding to a request from a second device to conduct a second transaction, wherein the second data includes second temporal data of the second transaction and at least one of: second GPS data of the second device, a second device identifier identifying the second device, a second network identifier identifying a network of the second device, or a second IP address of the second device;

generating a second token for the second transaction, the second token having a second scheduled routing time;

determining, based on transaction types of the first transaction and the second transaction, a comparison of at least the first temporal data and the second temporal data, and a comparison of a rest of the first data and a rest of the second data, that the first device and the second device are a same user device or are two separate devices sharing a common user, and that the second transaction occurred within a predefined amount of time before or after the first transaction;

in response to the determining, delaying a routing of the first token or a routing of the second token until on or after the second scheduled routing time and combining the first token and the second token into a single token; and transmitting, on or after the second scheduled routing time, the single token to one or more devices in a single transmission based on a single payload request.

17. The non-transitory machine-readable medium of claim 16, wherein the analyzing the first data, the generating the first token, the analyzing the second data, the generating the second token, the delaying, or the transmitting are performed by one or more hardware processors of a token service provider, and wherein the determining is further based on a relatedness score between the first transaction and the second transaction.

18. The method of claim 1, wherein the first device identifier or the second device identifier comprises a Universally Unique Identifier (UUID) or a Unique Device Identifier (UDID), and wherein the first network identifier or the second network identifier comprises a Media Access Control (MAC) address.

19. The non-transitory machine-readable medium of claim 16, wherein the determining further comprises determining, based on a comparison of the first GPS data and the second GPS data, that the first device and the second device are not the same user device but are located within a predefined distance from each other.

20. The non-transitory machine-readable medium of claim 16, wherein:

the determining further comprises determining that the first device and the second device are the same user device; and the transmitting comprises simultaneously transmitting the single token from a token vault to the same user device.

* * * * *